United States Patent
Ye et al.

(10) Patent No.: US 9,524,258 B2
(45) Date of Patent: Dec. 20, 2016

(54) METHOD FOR CONTROLLING MULTIPLE CAN INTERFACES THROUGH SINGLE SPI BUS

(71) Applicant: Guangdong Zhicheng Champion Group Co., LTD., Guangdong (CN)

(72) Inventors: Feihong Ye, Guangdong (CN); He Wang, Guangdong (CN); Minying Li, Guangdong (CN)

(73) Assignee: Guangdong Zhicheng Champion Group Co., LTD. (CN)

( * ) Notice: Subject to any disclaimer, the term of this patent is extended or adjusted under 35 U.S.C. 154(b) by 304 days.

(21) Appl. No.: 14/390,983

(22) PCT Filed: Apr. 19, 2013

(86) PCT No.: PCT/CN2013/074403
§ 371 (c)(1),
(2) Date: Oct. 6, 2014

(87) PCT Pub. No.: WO2014/101361
PCT Pub. Date: Jul. 3, 2014

(65) Prior Publication Data
US 2015/0089104 A1 Mar. 26, 2015

(30) Foreign Application Priority Data

Dec. 29, 2012 (CN) .......................... 2012 1 0593317

(51) Int. Cl.
*G06F 13/24* (2006.01)
*G06F 13/16* (2006.01)
*H04Q 9/00* (2006.01)

(52) U.S. Cl.
CPC ........... *G06F 13/24* (2013.01); *G06F 13/1673* (2013.01); *H04Q 9/00* (2013.01)

(58) Field of Classification Search
CPC ............ G06F 1/32; G06F 13/16; G06F 13/24; H04Q 2209/43
See application file for complete search history.

(56) References Cited

U.S. PATENT DOCUMENTS 7,539,888 B2 * 5/2009 Hu ................... H04L 12/40039
713/320
8,498,276 B2 * 7/2013 Hall .................. H04L 12/40026
370/336

(Continued)

FOREIGN PATENT DOCUMENTS

CN 101145046 A 3/2008
CN 101799783 A 8/2010

(Continued)

OTHER PUBLICATIONS

International Search Report from corresponding International Application No. PCT/CN2013/074403, mailed Aug. 8, 2013.

*Primary Examiner* — Henry Tsai
*Assistant Examiner* — Christopher A Daley
(74) *Attorney, Agent, or Firm* — Polster Lieder

(57) ABSTRACT

The disclosure is applied to a field of communication technologies and relates to a method for controlling multiple CAN interfaces through a single SPI bus. The method includes: when a reception mailbox of any of a plurality of CAN chips finishes receiving data on a CAN bus, triggering an interrupt by the CAN chip to deliver an interrupt signal; configuring the CAN chip triggering the interrupt through the SPI bus to disable interrupts in the CAN chip, so that the CAN chip exits the interrupt; inquiring the data received by the reception mailboxes of each CAN chip triggering the interrupt, reading the data into a memory buffer of an MCU through the SPI bus, setting a data identifier in the memory buffer of the MCU, and enabling interrupts in the CAN chip triggering the interrupt to allow the CAN chip triggering the (Continued)

interrupt to continue receiving data; and detecting whether the data identifier is present in the memory buffer of the MCU by an application program on the MCU, and copying the data from the memory buffer of the MCU to a memory buffer of the application program if the data identifier is present in the memory buffer of the MCU; otherwise, returning a result as a failure. The invention reads the data into the MCU upon interrupts generated by CAN chips, thereby reducing costs without affecting communication.

7 Claims, 4 Drawing Sheets

(56) References Cited

U.S. PATENT DOCUMENTS

| 8,775,841 B2* | 7/2014 | Neuscheler ............ H04L 12/12 |
| | | 713/320 |
| 9,021,075 B2* | 4/2015 | Rocher ............ H04L 12/40039 |
| | | 701/1 |
| 2005/0160301 A1* | 7/2005 | Disser .................... G06F 1/3209 |
| | | 713/310 |
| 2006/0039504 A1* | 2/2006 | Sicard ................ H04L 25/0292 |
| | | 375/317 |

FOREIGN PATENT DOCUMENTS

| CN | 101968643 A | 2/2011 |
| CN | 102508464 A | 6/2012 |
| CN | 102508799 A | 6/2012 |
| WO | 2007130730 A2 | 11/2007 |

* cited by examiner

METHOD FOR CONTROLLING MULTIPLE CAN INTERFACES THROUGH SINGLE SPI BUS

CROSS-REFERENCE TO RELATED APPLICATIONS

This application is a United States national phase application of co-pending international patent application number PCT/CN2013/074403, filed on Apr. 19, 2013 which claims priority to a Chinese patent application No. 201210593317.1 filed on Dec. 29, 2012, both of which are incorporated herein by reference in their entireties.

TECHNICAL FIELD

The present disclosure relates to a field of communication technologies, and in particular, to a method for controlling multiple CAN interfaces through a single SPI bus.

TECHNICAL BACKGROUND

Currently, multiple Controller Area Network (CAN) interfaces are applied to only a few fields mainly for the purpose of connecting with CAN buses having different CAN protocol formats or different CAN communication rates as desired. A Digital Signal Processor (DSP) chip providing multiple CAN interfaces on most Micro Controller Units (MCUs) supports only up to 2 CAN interfaces and hence has limited extensibility. A CAN communication chip with extensibility is generally controlled by a Serial Peripheral Interface (SPI) bus. A DSP chip providing multiple SPI interfaces on most MCUs supports only up to 2 SPI buses, and each of the SPI interfaces generally corresponds to only one CAN communication chip.

Nowadays, the multiple-CAN interface technologies generally utilize the above two manners, both of which have a limitation of being incapable of supporting an application having more than two CAN communication interfaces. The manner using a CAN controller on the MCU has the highest processing efficiency, but cannot support more CAN interfaces due to a hardware limitation, while the manner of extending the CAN interfaces through the SPI is limited by the number of the SPI buses.

SUMMARY OF THE INVENTION

An embodiment of the disclosure provides a method for controlling multiple CAN interfaces through a single SPI bus to solve a problem that a single SPI bus cannot control multiple CAN interfaces in the related art.

The embodiment of the disclosure is implemented by the method for controlling multiple CAN interfaces through a single SPI bus, and the method includes steps as below:

a storing process including:

a step A for, when a reception mailbox of any of a plurality of CAN chips finishes receiving data on a CAN bus, triggering an interrupt by the CAN chip to deliver an interrupt signal;

a step B for configuring, by an MCU through the SPI bus, the CAN chip triggering the interrupt to disable interrupts in the CAN chip, so that the CAN chip exits the interrupt; and a step C for inquiring, by the MCU, the data received by the reception mailbox of each CAN chip triggering the interrupt, reading the data into a memory buffer of the MCU through the SPI bus, setting a data identifier in the memory buffer of the MCU, and enabling interrupts in the CAN chip triggering the interrupt to allow the CAN chip triggering the interrupt to continue receiving data; and a reading process including:

a step D for detecting whether the data identifier is present in the memory buffer of the MCU by an application program on the MCU, and copying the data from the memory buffer of the MCU to a memory buffer of the application program if the data identifier is present in the memory buffer of the MCU; otherwise, returning a result as a failure.

With the method, the data is read into the MCU upon interrupts generated by CAN chips, thereby reducing costs without affecting communication.

DETAILED DESCRIPTION OF THE PREFERRED EMBODIMENT

In order to make objects, technical solutions and advantages of the invention more clear and apparent, the invention is further illustrated in detail below in conjunction with accompanying drawings and embodiments. It should be understood that specific embodiments described herein is merely intended to explain the invention but not limited to the invention.

Figure 1:
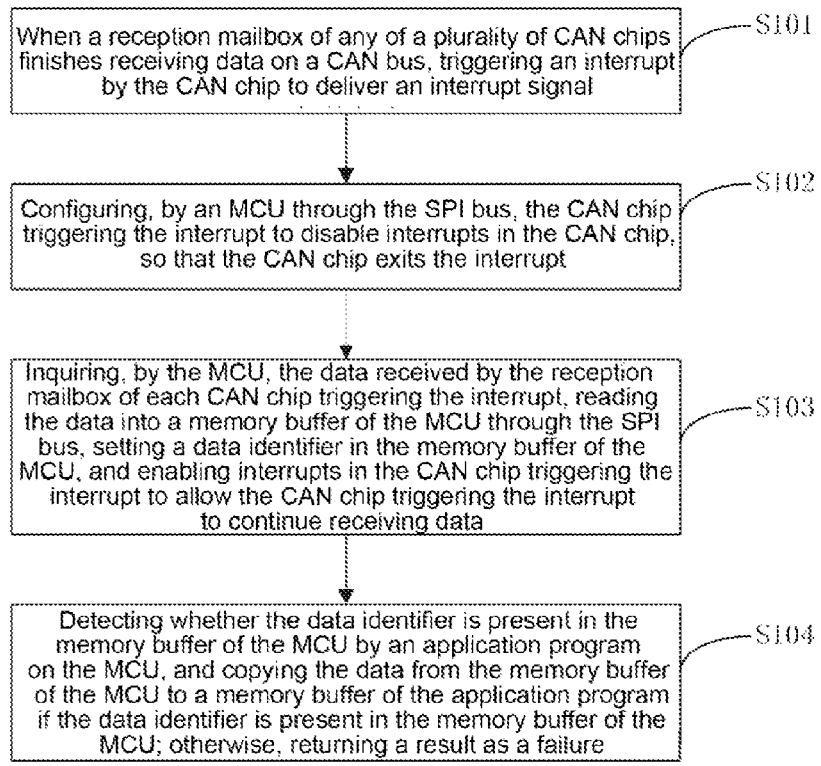
FIG. 1 is a flowchart showing a method for controlling multiple CAN interfaces through a single SPI bus according to an embodiment of the disclosure.

FIG. 1 is a flowchart showing a method for controlling multiple CAN interfaces through a single SPI bus according to an embodiment of the disclosure, and the method is described in detail as follows.

In Step S101, when a reception mailbox of any one of a plurality of CAN chips finishes receiving data on a CAN bus, the CAN chip triggers an interrupt to transmit an interrupt signal.

In the embodiment of the disclosure, three different types of devices are managed by a system in a CAN communication manner. These three different types of devices have different communication protocol formats and different communication rates, and hence cannot normally communicate based on one or two independent CAN buses, thus a way with three supported independent CAN buses is needed.

Figure 2:
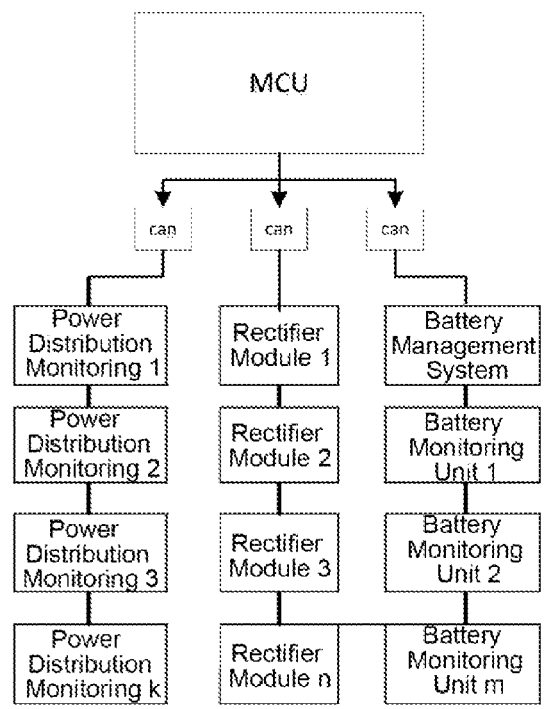
FIG. 2 is a block diagram of a system according to the embodiment of the disclosure.
Figure 3:
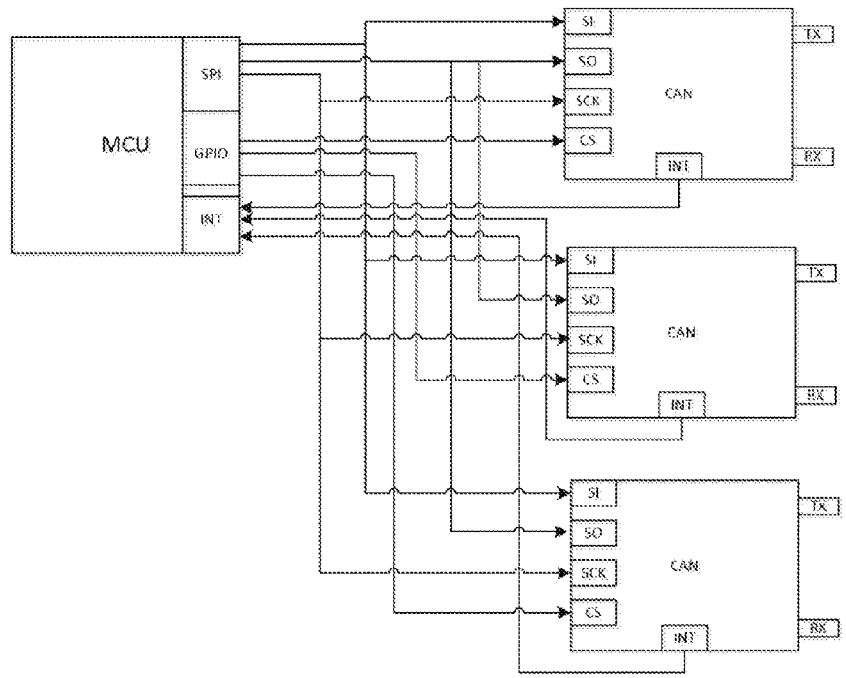
FIG. 3 is a schematic diagram showing hardware connections according to the embodiment of the disclosure.

A master DSP is not integrated with a built-in CAN transceiver, and must cooperate with external CAN transceiver chips controlled by the SPI interface. However, the master DSP has only one SPI interface. As shown in FIG. 2 which is a block diagram of the system according to the embodiment of the disclosure, pin resources on the MCU are fully utilized in design and three CAN transceivers share one SPI bus. As shown in FIG. 3 which is a schematic diagram showing hardware connections according to the embodiment of the disclosure, chip selection (CS) can be implemented by a General Purpose Input Output (GPIO), and reception interrupts of the three CAN transceivers respectively correspond to three interrupt pins of the master DSP.

Underlying layer driving interface designs in the software design mainly include two main parts, i.e. the processing of a data receiving interrupt and the processing of a data receiving task. An application layer interface design mainly includes two parts, i.e. a data transmitting interface and a data reading interface. The processing of the data receiving interrupt, the processing of the data receiving task, and the data reading interface constitute an input processing part in the present disclosure and the data transmitting interface constitutes an output processing part in the present disclosure. The SPI bus is utilized in a mutually exclusive manner by the processing of the data receiving interrupt, the processing of the data receiving task, the data transmitting interface, and the data reading interface.

In Step S102, through the SPI bus, the MCU configures the CAN chip triggering the interrupt to disable interrupts inside the CAN chip, and the CAN chip exits the interrupt.

In an embodiment of the disclosure, interrupts are disabled in order to prevent the CAN chip from continuously generating interrupts before the MCU reads out the data from the CAN chip, so that an endless loop caused by that the MCU is kept in handling interrupt requests without time for reading data is avoided.

In step S103, through the SPI bus, the MCU inquires the data received by the reception mailbox of each CAN chip triggering the interrupt, reads the data into a memory buffer of the MCU through the SPI bus, sets an data identifier in the memory buffer of the MCU, and enables interrupts in the CAN chip triggering the interrupt to allow the CAN chip triggering the interrupt to continue receiving data.

In step S104, an application program on the MCU detects whether the data identifier is present in the memory buffer of the MCU, and copies the data in the memory buffer of the MCU to a memory buffer of the application program if the data identifier is present; otherwise, the MCU returns a failure.

In the embodiment of the disclosure, the MCU may inform any of the CAN chips through the SPI bus to deliver the data to the CAN bus connected with the CAN chip. The data can be delivered without the interrupt, and hence can be delivered as long as a right to use the chip select signal (i.e. a mutex semaphore for the chip select signal) is obtained, and a failure reason is returned if the data fails to be delivered.

In the embodiment of the disclosure, before receiving and delivering the data, each CAN chip of the system is processed by:

sequentially configuring an interrupt vector and an interrupt handling function corresponding to each CAN chip; initializing a mutex semaphore for a chip select signal of the CAN chip as well as a data receiving buffer corresponding to the CAN chip; and sequentially configuring a rate, a reception filter, and a wakeup function of each CAN chip in order to make each CAN chip run properly.

Figure 4:
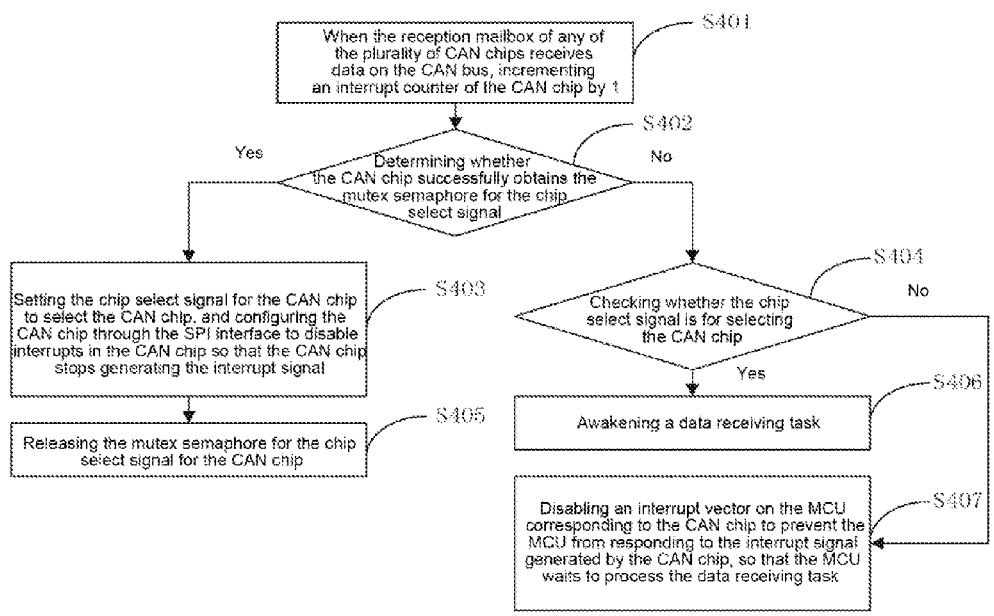
FIG. 4 is a flowchart for generating an interrupt by a CAN chip according to the embodiment of the disclosure.

FIG. 4 shows a flowchart for generating an interrupt by the CAN chip according to the embodiment of the disclosure, and the flowchart is described below in detail.

In Step S401, when the reception mailbox of any of a plurality of CAN chips receives data on the CAN bus, an interrupt counter of the CAN chip is increased by 1.

In Step S402, it is determined whether the CAN chip successfully obtains the mutex semaphore for the chip select signal; and Step S403 is performed if the CAN chip successfully obtains the mutex semaphore for the chip select signal; otherwise, Step S404 is performed.

In Step S403, the chip select signal for the CAN chip is set to select the CAN chip, and the CAN chip is configured through the SPI interface to disable interrupts inside the CAN chip so that the CAN chip is prevented from generating an interrupt signal; and then Step S405 is performed.

In Step S404, it is checked whether the chip select signal is for selecting the CAN chip; and Step S406 is performed if the chip select signal is for selecting the CAN chip; otherwise, Step S407 is performed.

In Step S405, the mutex semaphore for the chip select signal for the CAN chip is released.

In Step S406, a data receiving task is awaken.

In Step S407, the interrupt vector on the MCU corresponding to the CAN chip is disabled in order to prevent the MCU from responding to the interrupt signal generated by the CAN chip, so that the MCU waits to process the data receiving task.

In the embodiment of the disclosure, when the reception mailbox of the CAN chip has received the data on the CAN bus, the CAN chip generates the interrupt signal to inform the MCU to process the data, so that the interrupt handling function is called. The interrupting function for data reception is designed such that an interrupt of each CAN device corresponds to one independent interrupt processing process in order to manage parameter information of the individual CAN device. A mechanism having two stages for disabling interrupts is particularly added to the interrupt processing process to solve different interrupt problems, including an interrupt problem to be solved by the first stage which is that one SPI bus is shared by a plurality of devices and hence the mutex semaphore must be added to ensure the use of the SPI bus by each of the devices, and an interrupt problem to be solved by the second stage which is that the delivery and reception of the data on the CAN bus through the SPI also need to use the SPI bus in the mutually exclusive manner when the SPI bus is occupied by a certain device.

In the whole interrupt processing process, the second stage of the interrupt processing process needs to be processed particularly. Specifically, the system interrupt vector registered by the current device is disabled, and the reception interrupt triggering function of the device is suspended before the data receiving task is finished. Then the system interrupt vector is enabled again after the data receiving task is finished.

Figure 5:
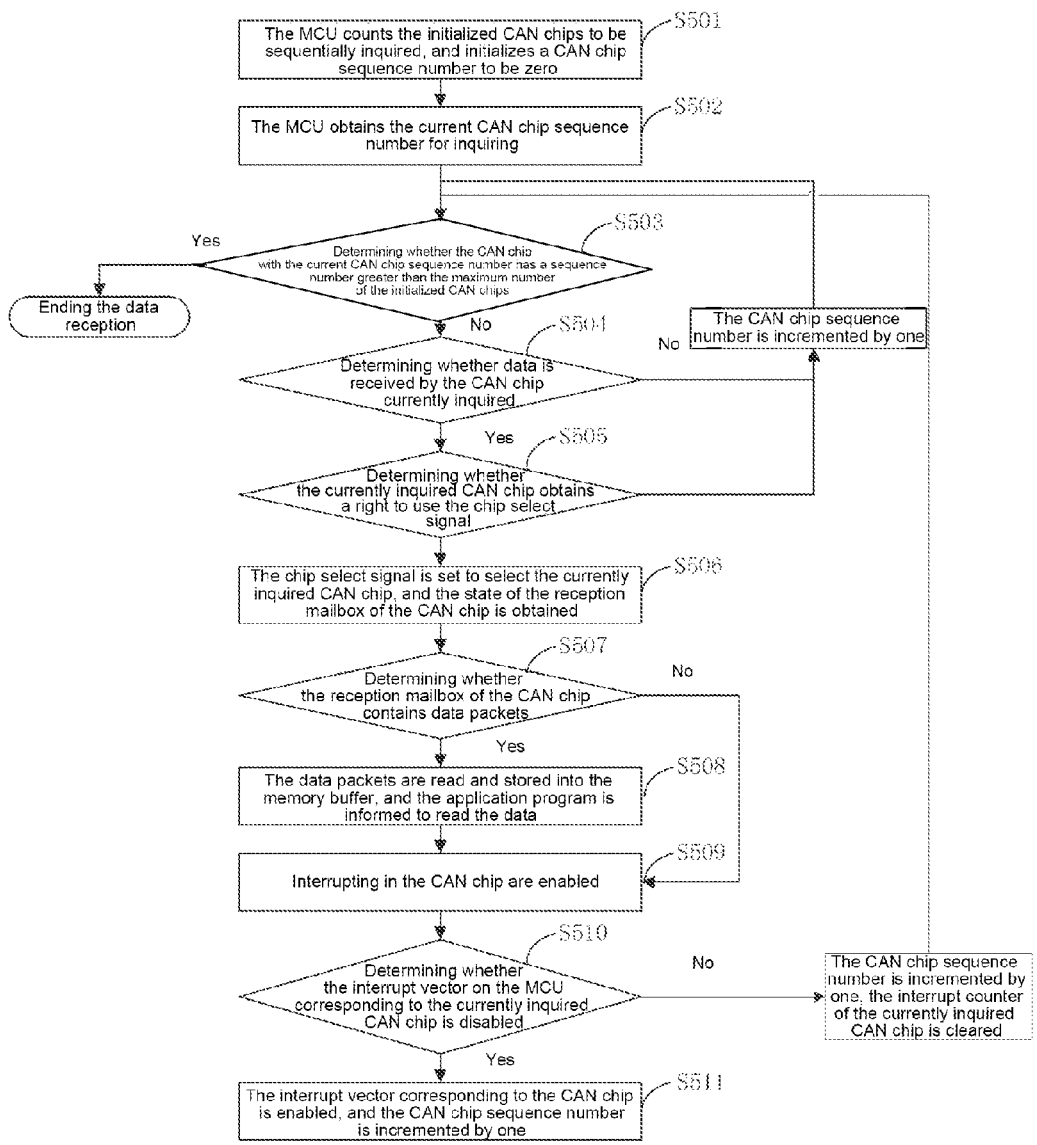
FIG. 5 is a flowchart for receiving data according to the embodiment of the disclosure.

FIG. 5 shows a flowchart for receiving data according to the embodiment of the disclosure, and the flowchart is described in detail as below.

In Step S501, the MCU counts the initialized CAN chips to be sequentially inquired, and initializes a CAN chip sequence number to be zero.

In Step S502, the MCU obtains the current CAN chip sequence number for inquiring.

In Step S503, the MCU determines whether the CAN chip with the current CAN chip sequence number has a sequence number greater than the maximum number of the initialized CAN chips, and ends the data reception if the sequence number of the CAN chip is greater than the maximum number of the initialized CAN chips; otherwise, Step S504 is performed.

In Step S504, the MCU determines whether data is received by the CAN chip currently inquired according to an interrupt counter of the CAN chip currently inquired, and Step S505 is performed if data is received by the CAN chip currently inquired; otherwise, the CAN chip sequence number is incremented by one, and the process returns to Step S503.

In Step S505, the MCU determines whether the currently inquired CAN chip obtains a right to use the chip select signal, and performs Step 506 if the currently inquired CAN chip obtains the right to use the chip select signal; otherwise, the CAN chip sequence number is incremented by one, and the process returns to Step S503.

In Step S506, the chip select signal is set to select the currently inquired CAN chip, and the state of the reception mailbox of the CAN chip is obtained.

In Step S507, it is determined whether the reception mailbox of the CAN chip contains data packets, and perform Step S508 if the reception mailbox of the CAN chip contains data packets; otherwise, Step S509 is performed.

In Step S508, the data packets are read and stored into the memory buffer, and the application program is informed to read the data.

In Step S509, interrupts in the CAN chip are enabled.

In Step S510, it is determined whether the interrupt vector on the MCU corresponding to the currently inquired CAN chip is disabled, and Step S511 is performed if the interrupt vector on the MCU corresponding to the CAN chip is disabled; otherwise, the CAN chip sequence number is incremented by one, the interrupt counter of the currently inquired CAN chip is cleared, and the process returns to Step S503.

In Step S511, the interrupt vector corresponding to the CAN chip is enabled, and the CAN chip sequence number is incremented by one.

In the embodiment of the disclosure, the data receiving task is designed to be shared by a plurality of CAN devices. This design is aimed to uniformly process the data receiving tasks of the plurality of devices in order to avoid the case where a busy CAN bus always occupies the processing resources of the CPU and the data on other CAN buses cannot be received in time and hence is lost.

Figure 6:
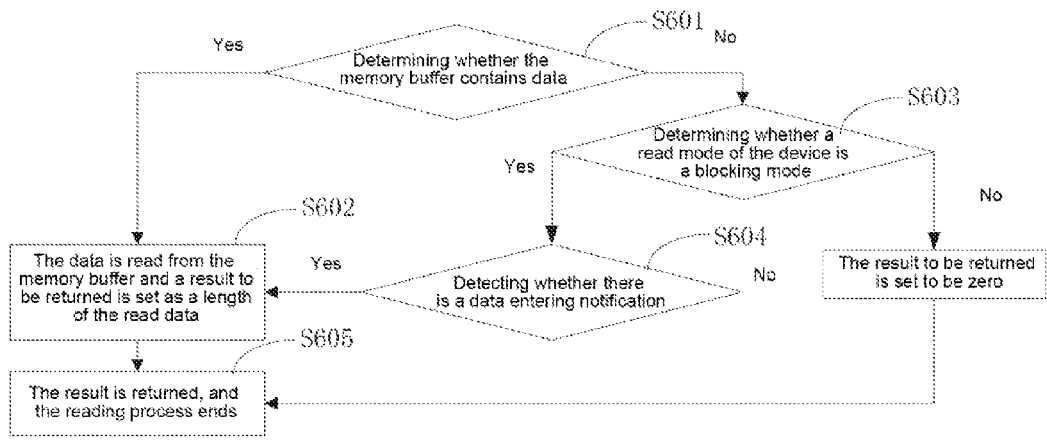
FIG. 6 is a flowchart for reading data according to the embodiment of the disclosure and FIG. 7 is a flowchart for delivering data according to the embodiment of the disclosure.

FIG. 6 shows a flowchart for reading data according to the embodiment of the disclosure, and the flowchart is described in detail as below.

In Step S601, it is determined whether the memory buffer contains data, and Step S602 is performed if the memory buffer contains data; otherwise, Step S603 is performed.

In Step S602, the data is read from the memory buffer and a result to be returned is set as a length of the read data, and then Step S605 is performed.

In Step S603, it is determined whether a read mode of the device is a blocking mode, and Step S604 is performed if the read mode of the device is the blocking mode; otherwise, the result to be returned is set to be zero, and Step S605 is performed.

In Step S604, it is detected whether there is a data entering notification, and Step S602 is performed if there is the data entering notification.

In Step S605, the result is returned, and the reading process ends.

Figure 7:
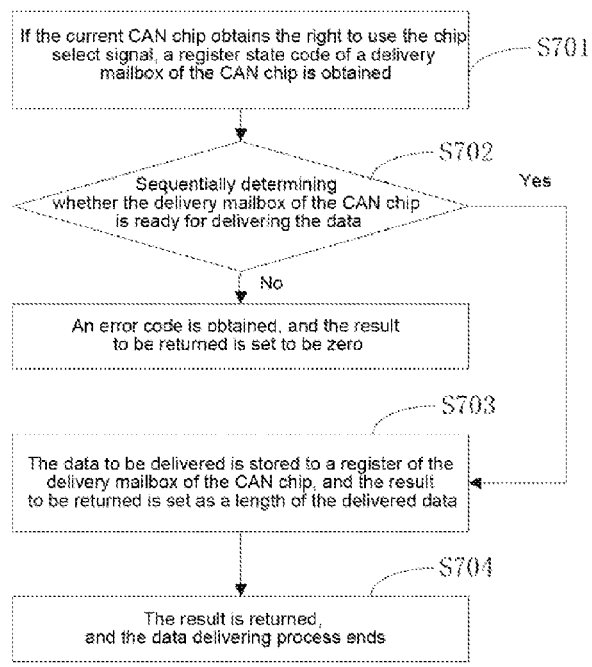

FIG. 7 shows a flowchart for delivering data according to the embodiment of the disclosure, and the flowchart is described in detail as below.

In Step S701, if the current CAN chip obtains the right to use the chip select signal, a register state code of a delivery mailbox of the CAN chip is obtained.

In Step S702, it is sequentially determined whether the delivery mailbox of the CAN chip is ready for delivering the data, and Step S703 is performed if the delivery mailbox of the CAN chip is ready for transmitting the data; otherwise, an error code is obtained, the result to be returned is set to be zero, and Step S704 is performed.

In Step S703, the data to be delivered is stored to a register of the delivery mailbox of the CAN chip, and the result to be returned is set as a length of the delivered data.

In Step S704, the result is returned, and the data delivering process ends.

In the embodiment of the disclosure, when a user needs to deliver data, the data delivering interface in the application layer, which delivers the data in a non-blocking manner, is called, that is, the data to be delivered is configured in the register of the CAN chip and then is delivered by the CAN chip per se. When the reception mailbox of the CAN chip receives data on the CAN bus, the CAN chip generates an interrupt signal to inform the MCU to process the received data so that the interrupt handling function is called. The interrupt handling function is mainly configured for clearing interrupt flags within the CAN chip and calling a data receiving task function. After being called, the data receiving task function immediately reads the data received in the reception mailbox of the CAN chip into the memory of the MCU through the SPI bus in order to allow the CAN chip to continue receiving data, and another task of the data receiving task function is for delivering a signal after the data is received in order to inform a reading function in the application layer that the data is available.

The disclosure has been applied to a high voltage direct current supplying system and a direct current electromobile charging system. The operating effect of the product can meet the requirements of the users. Furthermore, the manufacturing cost is reduced without affecting the process for delivering and receiving the communication data and the accuracy of the communication data.

In the disclosure, the data are read into the MCU upon interrupts generated by CAN chips, thereby reducing costs without affecting the communication.

The preferred embodiments of the present invention are described as above, and it should be understood by those ordinary skilled in the art that some improvements and modifications can be made without departing the principles of the invention. These improvements and modifications should fall into the scope of the present invention.

The invention claimed is:

1. A method for controlling multiple Controller Area Network (CAN) interfaces through a single Serial Peripheral Interface (SPI) bus, comprising a storing process and a reading process, wherein, the storing process comprises: a step A for, when a reception mailbox of any of a plurality of CAN chips finishes receiving data on a CAN bus, triggering an interrupt by the CAN chip to deliver an interrupt signal; a step B for configuring, by a Micro Controller Unit (MCU) through the bus, the CAN chip triggering the interrupt to disable interrupts in the CAN chip, so that the CAN chip exits the interrupt; and a step C for inquiring, by the MCU, the data received by the reception mailbox of each CAN chip triggering the interrupt, reading the data into a memory buffer of the MCU through the SPI bus, setting a data identifier in the memory buffer of the MCU, and enabling interrupts in the CAN chip triggering the interrupt to allow the CAN chip triggering the interrupt to continue receiving data; the reading process comprises: a step D for detecting whether the data identifier is present in the memory buffer of the MCU by an application program on the MCU, and copying the data from the memory buffer of the MCU to a memory buffer of the application program if the data identifier is present in the memory buffer of the MCU; otherwise, returning a result as a failure.

2. The method of claim 1, further comprising:
a delivering process, comprising:

a step E for informing, by the MCU through the SPI bus, the any of the plurality of the CAN chips to deliver the data to the CAN bus connected with the CAN chip.

3. The method of claim 1, before the step A, further comprising:

sequentially configuring an interrupt vector and an interrupt handling function which correspond to each CAN chip, and initializing a mutex semaphore for a chip selecting signal of the CAN chip as well as a data receiving memory buffer corresponding to each CAN chip; and sequentially configuring a rate, a reception filter, and a wakeup function of each CAN chip.

4. The method of claim 1, wherein, the step B comprises:

a step B1 for, when the reception mailbox of any of the plurality of CAN chips receives data on the CAN bus, incrementing an interrupt counter of the CAN chip by 1;

a step B2 for determining whether the CAN chip successfully obtains the mutex semaphore for the chip select signal; and performing a step B3 if the CAN chip successfully obtains the mutex semaphore for the chip select signal; otherwise, performing a step B4;

the step B3 for setting the chip select signal for the CAN chip to select the CAN chip, and configuring the CAN chip through the SPI interface to disable interrupts in the CAN chip so that the CAN chip stops generating the interrupt signal; and performing a step B5;

the step B4 for checking whether the chip select signal is for selecting the CAN chip; performing a step B6 if the chip select signal is for selecting the CAN chip; otherwise, performing a step B7;

the step B5 for releasing the mutex semaphore for the chip select signal for the CAN chip;

the step B6 for awakening a data receiving task; and the step B7 for disabling an interrupt vector on the MCU corresponding to the CAN chip to prevent the MCU from responding to the interrupt signal generated by the CAN chip, so that the MCU waits to process the data receiving task.

5. The method of claim 1, wherein, the step C comprises:

a step C1 for counting, by the MCU, the initialized CAN chips to be sequentially inquired, and initializing a CAN chip sequence number to be zero;

a Step C2 for obtaining, by the MCU, the current CAN chip sequence number for inquiring;

a Step C3 for determining, by the MCU, whether the CAN chip with the current CAN chip sequence number has a sequence number greater than the maximum number of the initialized CAN chips, and ending receiving the data if the sequence number of the CAN chip is greater than the maximum number of the initialized CAN chips; otherwise, performing a step C4;

the step C4 for determining whether data is received by the CAN chip currently inquired according to an interrupt counter of the CAN chip currently inquired, and performing a step C5 if data is received by the CAN chip currently inquired; otherwise, incrementing the CAN chip sequence number by one, and returning to the step C3;

a step C5 for determining whether the CAN chip currently inquired obtains a right to use the chip select signal, and setting the chip select signal to select the currently inquired CAN chip and obtaining a state of the reception mailbox of the CAN chip if the CAN chip currently inquired obtains the right to use the chip select signal; otherwise, incrementing the CAN chip sequence number by one, and returning to the step C3;

a step C6 for determining whether the reception mailbox of the CAN chip contains data packets, and reading the data packets and storing the read data packets into the memory buffer of the MCU, and informing the application program to read the data; otherwise, performing a step C7; and the Step C7 for enabling interrupts in the CAN chip, and determining whether the interrupt vector on the MCU corresponding to the CAN chip is disabled, and enabling the interrupt vector corresponding to the CAN chip if the interrupt vector on the MCU corresponding to the CAN chip is disabled, and incrementing the CAN chip sequence number by one; otherwise, incrementing the CAN chip sequence number by one, clearing the interrupt counter of the currently inquired CAN chip, and returning to Step C3.

6. The method of claim 1, wherein the step D comprises:

a step D1 for determining whether the memory buffer of the MCU contains data, wherein a step D2 is performed if the memory buffer of the MCU contains data; otherwise, a step D3 is performed;

the step D2 for reading the data from the memory buffer of the MCU and setting a result to be returned as a length of the read data; and then performing a step D5;

the step D3 for determining whether a device read mode is a blocking mode; and, performing a step D4 if the device read mode is a blocking mode; otherwise, setting the result to be returned as zero, and performing a step D5;

the step D4 for detecting whether there is a data entering notification; and performing the Step D2 if there is the data entering notification; and the Step D5 for returning the result, and exiting the reading process.

7. The method of claim 2, wherein, the Step E comprises:

a step E1 for, if the CAN chip currently inquired obtains the right to use the chip select signal, obtaining a register state code of a delivery mailbox of the CAN chip;

a step E2 for sequentially determining whether the delivery mailbox of the CAN chip is ready for delivering the data; and performing a step E3 if the delivery mailbox of the CAN chip is ready for delivering the data; otherwise, obtaining an error code, setting the result to be returned as zero, and performing Step E4;

the step E3 for storing the data to be delivered to a register of the delivery mailbox of the CAN chip, and setting the result to be returned as a length of the transmitted data; and a step E4 for returning the result, and exiting the data delivering process.

* * * * *